United States Patent [19]
Winders

[11] Patent Number: 5,711,249
[45] Date of Patent: Jan. 27, 1998

[54] MARKING DEVICE

[75] Inventor: Gerard Bert Winders, Invercargill, New Zealand

[73] Assignee: Genesis Industries Incorporated, Spring Valley, Wis.

[21] Appl. No.: 564,924

[22] Filed: Nov. 29, 1995

[30] Foreign Application Priority Data

Nov. 30, 1994 [NZ] New Zealand .................... 270027

[51] Int. Cl.⁶ ..................................... A01K 11/00
[52] U.S. Cl. ........................ 119/174; 606/116; 401/6
[58] Field of Search .................... 119/174, 856, 119/860; 101/327, 368, 372; 606/116, 117, 201, 202, 203; 401/7, 8; 604/116

[56] References Cited

U.S. PATENT DOCUMENTS

| | | |
|---|---|---|
| 1,382,015 | 6/1921 | Rudolph . |
| 1,680,819 | 8/1928 | Steindorff . |
| 2,678,022 | 5/1954 | Jourgensen . |
| 3,158,094 | 11/1964 | Harris et al. . |

FOREIGN PATENT DOCUMENTS 1357672 12/1964 France .

*Primary Examiner*—Thomas Price
*Attorney, Agent, or Firm*—Joel D. Skinner, Jr.; Skinner And Associates

[57] ABSTRACT

A method and apparatus of marking livestock, objects and surfaces comprising:

selecting a marker cartridge containing a marking means of a selected type, colour or design;

securely engaging the marker cartridge into a marker cartridge receiver;

attaching the cartridge receiver to a user's wrist with a strap; and marking livestock, objects and surfaces with the selected marking means in the marker cartridge.

14 Claims, 3 Drawing Sheets

MARKING DEVICE

FIELD OF THE INVENTION

This invention relates to a method and apparatus for marking, and in particular but not limited to, for marking livestock, wherein the apparatus is adapted for attachment to the wrist, arm, hand, knee, leg or extremity of user. Also intended application for marking objects in the forestry, packaging and processing industries.

BACKGROUND TO THE INVENTION

Stock marking can be a cumbersome and time consuming task, particularly where the device employed for marking must be hand held. With such devices the user has at best only one hand available for controlling animals or performing other functions.

Thus, it is an object of the present invention to provide a method and apparatus for marking items, and particularly livestock, which leaves the user the substantial free use of both hands, and which therefore reduces the abovementioned problem, or which at least provides the public with a useful alternative.

SUMMARY OF THE INVENTION

According to one aspect of the present invention there is provided a marking device for attachment to a user's wrist or other extremities comprising a cartridge receiver adapted for attachment of at least one strap and for securely engaging a marker cartridge, and a marker cartridge adapted to securely engage into the cartridge receiver and to securely retain a marking means.

According to a further aspect of the present invention there is provided a marking device for attachment to a user's wrist comprising a cartridge receiver comprising a receptacle with at least one strap attachment means at a lower outer part thereof and an interlocking means for securely engaging a marker cartridge in the receptacle, and a marker cartridge comprising a container with at least one blocking means for securely engaging the container in the marker cartridge receiver and a marking means.

In a preferred form the container may have a base plate adapted to provide a securing means for the marking means. Preferably the base plate may be moveable and may form a friction fit within the container but can slide vertically within the container when pressure is applied to the base plate.

In a preferred form the interlocking means of the cartridge receiver may comprise at least one segment of the receptacle which protrudes into the receptacle and forms a substantially horizontal slot between a lower surface of the segment and an upper surface of a partial base of the receptacle, and the locking means of the marker cartridge may comprise at least one flange at a lower edge of the container, and wherein the at least one flange can fit between or around the at least one segment and engage the slot beneath the segment(s), thus interlocking the marker cartridge in the cartridge receiver.

Preferably the receptacle and container of the marking device may be cylindrical.

In a further preferred form the partial base of the receptacle may have an orifice which permits access to the moveable base plate of the container when the marker cartridge is securely interlocked with the cartridge receiver.

In a further preferred form of the invention the securing means for the marking means may comprise a recess at a lower inner part of a hollow centre of the base plate.

Preferably, the marking means may be wax.

In a further aspect the present invention comprises a marker cartridge for a marking device, the cartridge comprising a container with at least one locking means for securely engaging the container in a cartridge receiver, and a base plate adapted to provide a securing means for a marking means. Preferably the base plate is moveable and may form a friction fit within the container but be capable of sliding vertically in the container when pressure is applied to the base plate. Further models envisaged may include a screw design to vertically raise and lower the marker cartridge.

In a further aspect of the present invention there is provided a cartridge receiver for a marking device, comprising a receptacle with at least one strap attachment means at a lower outer part thereof and an interlocking means for securely engaging a marker cartridge in the receptacle. Still a further aspect of the present invention comprises a method of marking livestock, objects and surfaces comprising:

selecting a marker cartridge containing a marking means of a selected type, colour or design, securely engaging the marker cartridge into a marker cartridge receiver, attaching the cartridge receiver to a user's wrist with a strap, and marking livestock, objects and surfaces with the selected marking means in the marker cartridge.

Other aspects of the present invention will become apparent from the following description which is given by way of example only and with reference to the accompanying drawings in which:

DESCRIPTION OF THE PREFERRED EMBODIMENT

Figure 1:
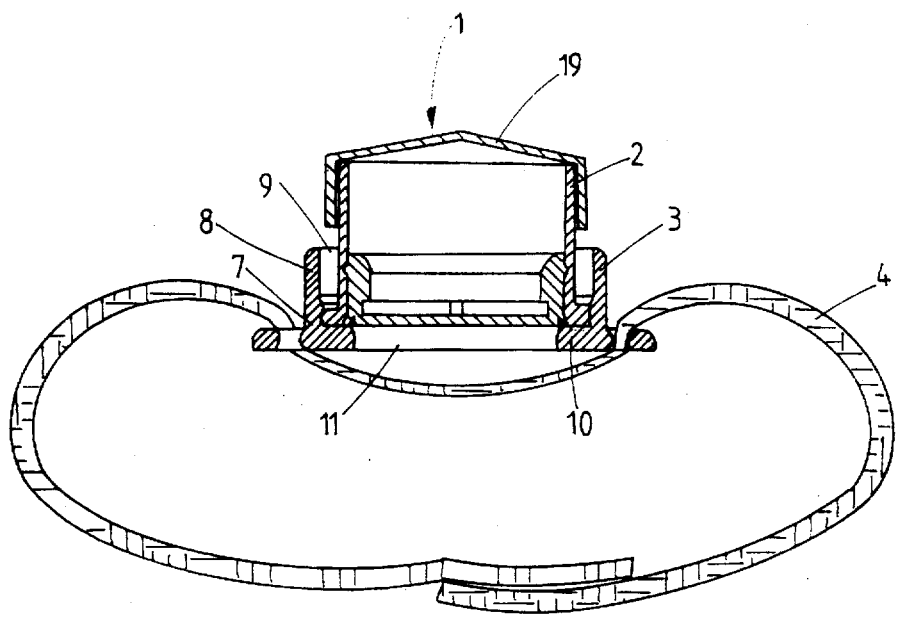
FIG. 1: shows a cross-section through a preferred embodiment of a marking device of the present invention.
Figure 2:
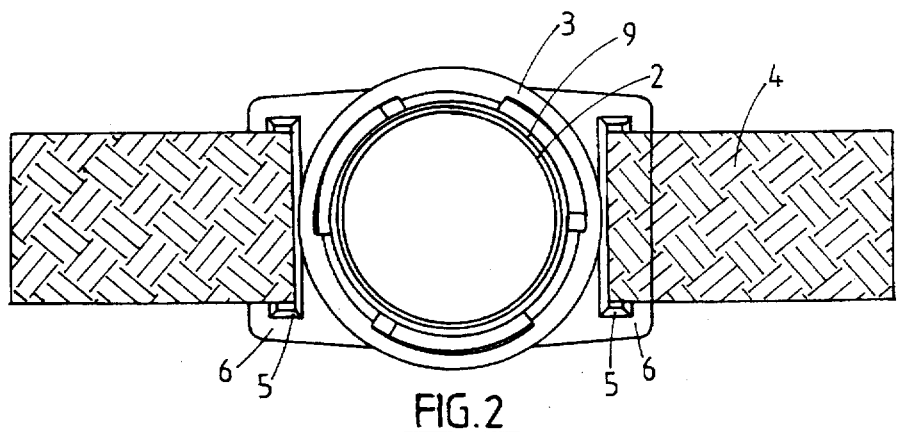
FIG. 2: shows a view from above of the preferred embodiment of FIG. 1.

FIGS. 1 and 2 show a preferred embodiment of the marking device 1 of the present invention comprising the marker cartridge 2 securely fastened in a marker cartridge receiver 3 and with strap 4 for attaching the device to a user's wrist. A removable sealing lid 19 is shown in position in FIG. 1.

Although the preferred embodiments presented in the drawings show a single strap, it will be appreciated that separate straps may be attached to each attachment means of the marker cartridge receiver. Further, while the preferred form of strap may use a velcro closure, it will be appreciated that any other forms of strap with appropriate buckles or connection means are also envisaged.

The cartridge receiver 3 has a strap attachment means 5 located on each of two flanges 6 protruding from a lower part 7 of the cartridge receiver 3. The upper part 8 of the cartridge receiver 3 forms a cylindrical receptacle 9 with a partial base 10. There is an orifice 11 in the centre of the partial base 10.

Figure 3:
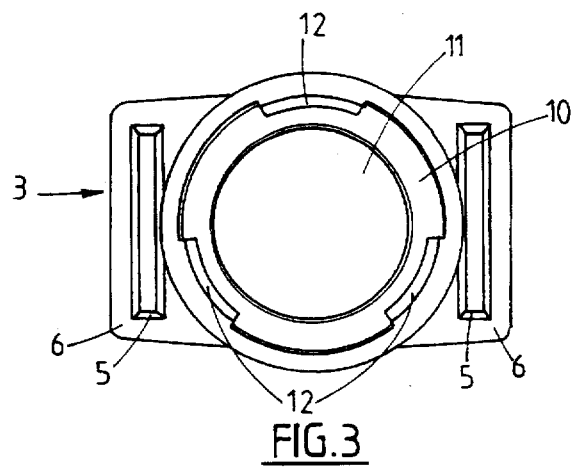
FIG. 3: shows a view from above of a preferred from of a cartridge receiver of the present invention.
Figure 4:
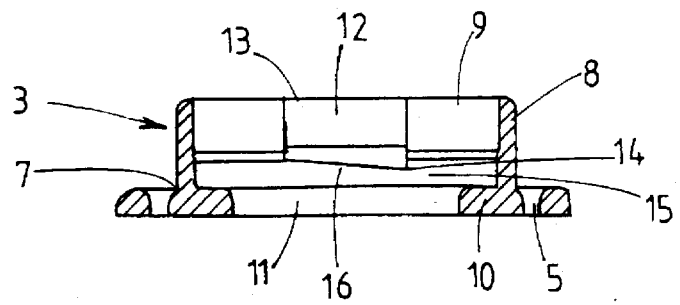
FIG. 4: shows a side view through the cartridge receiver of FIG. 3 cut in half and showing the inner part of the receptacle of this cartridge receiver.

Now referring to FIGS. 3 and 4, it can be seen that the cylindrical receptacle 9 has segments 12 which protrude into the receptacle from the upper edge 13 to a point 14 above the partial base 10, i.e. leaving a slot 15 between the partial base 10 and the lower surface 16 of the segments 12. In the preferred embodiment shown in FIG. 3 the lower surface 16 of the segments 12 are angled in relation to the horizontal partial base 10.

Figure 5:
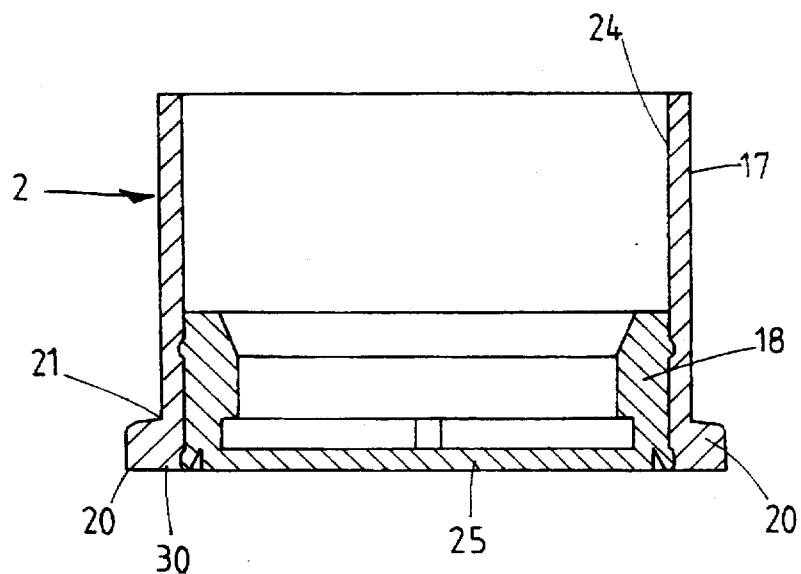
FIG. 5: shows a side view of a preferred embodiment of a marker cartridge of the present invention.
Figure 6:
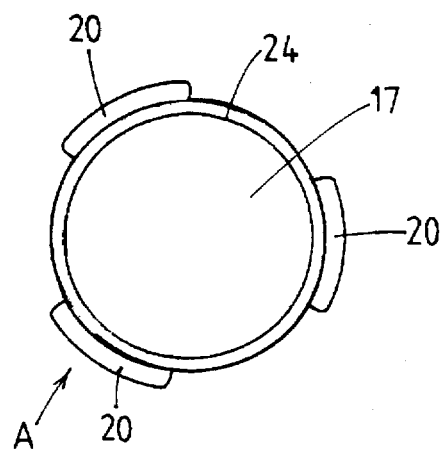
FIG. 6: shows a view from above of a container of the marker cartridge of FIG. 5.

In FIG. 5 it may be seen that the marker cartridge 2 comprises a container 17 and a base plate 18. Optionally there is also a sealing lid 19 (as shown in FIG. 1). The container 17 has flanges 20 protruding from a lower part 21. The preferred embodiment shown in the Figures has three flanges 20 which can slide between the three corresponding segments 12 of the marker cartridge receiver 3.

Figure 7:
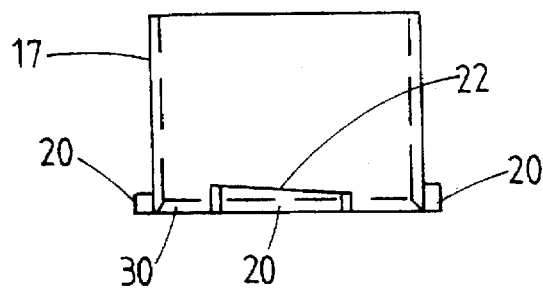
FIG. 7: shows a side view from A of the container in FIG. 6.

Viewed from the side, as shown in FIG. 7 the flanges 20 have an angled upper surface 22. This angled upper surface 22 is the inverse of the angled lower face 16 of the segments 12 of the cartridge receiver 3.

Thus, the marker cartridge 2 may be interlocked in the cartridge receiver 3 by sliding the flanges 20 between the segments 12 until the lower surface 30 of the container 17 rests on the partial base 10 of the receptacle 9. The cartridge 2 is then twisted to interlock the upper angled surfaces 22 of the flanges 20 of the container 17 with the lower angled surfaces 16 of the segments 12 of the cartridge receiver 3, (i.e. the flanges 20 slide into the slots 15). The marker cartridge 2 may be readily removed by twisting it in the opposite direction to release the flanges 20 of the container 17 from the slots 15 of the cartridge receiver 3 and then lifting the cartridge 2 from the receiver 3.

Figure 8A:
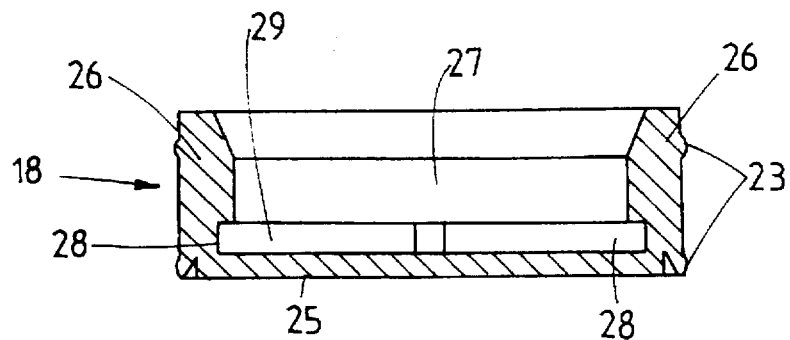
FIG. 8: shows a cross-section through a base plate of the marker cartridge of FIG. 5, (a) empty and (b) with wax marker in place.
Figure 8B:
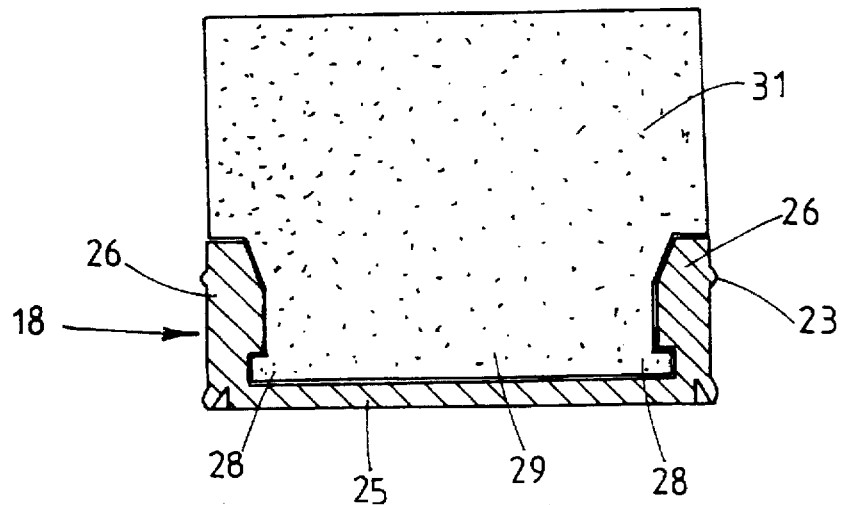

The base plate 18 of the marker cartridge 2, as shown in FIGS. 5 and 8, has sealing rings 23 on the outer circumference which form a friction fit between the base plate 18 and the inner surface 24 of the container 17. The base plate 18 has a base 25, side walls 26 and a hollow centre 27. The side walls 26 are recessed 28 at a lower part 29 of the hollow centre 27. This recess 28 provides a means for securing a marking means (shown in FIG. 8(b) as a wax marker 31) to the base plate 18 and therefore within the container 17 when the base plate 18 is in place in the container 17.

The preferred marking means used in the embodiment of the present invention shown in the Figures is a marker of wax. Thus, with the base plate 18 in position at the base of the container 17 molten wax may be poured into the container 17, or heated soft wax may be forced into the container 17. When the wax solidifies a ridge of wax is trapped in the recess 28 to securely hold the wax on the base plate 18.

It will be appreciated that a wax marker is only one type of marking means which may be used with the marking device of the present invention. Other types of marking means are envisaged and may be adapted to fit in the marker cartridge of the present invention. For example, a dye or ink marker with a gauze covered adsorbent pad is one such alternative marking means envisaged.

Although the base plate 18 forms a friction fit in the container 17, the application of pressure to the base 25 of the base plate 18 will force the base plate 18 up inside the container 17, raising the level of a marking means securely attached to the base plate. Thus, when the marking means is of wax, which wears down with use, adequate marking of stock or any item is ensured by raising the level of the marking means in the container as and when necessary.

The orifice 11 in the partial base 10 of the cartridge receiver 3 enables the base plate 18 of the cartridge 2 to be pushed up the container 17 without removal of the marker cartridge 2 from the cartridge receiver 3.

The marker cartridge employed in the marking device of the present invention is designed to be removable to enable simple replacement of the cartridge either for the purposes of refill or to allow the selection of a cartridge containing a marking means of different colour, design or type.

Although the invention has been described by way of example, and with particular reference to the preferred embodiment shown in the accompanying drawings, it should be appreciated that variations and modifications may be made thereto, without departing from the scope of the invention as defined in the following claims.

For example, the preferred embodiment shows the receptacle of the cartridge receiver and container of the marker cartridge to be cylindrical, but other shapes would be equally suitable providing that the receptacle and container are of compatible shapes, and the means for interlocking the two are appropriately adapted. Furthermore, any number of variations in the means of interlocking the marker cartridge and the cartridge receiver are envisaged without departing from the scope and spirit of the present invention and the attached claims.

What we do claim and desire to obtain by Letters Patent of the United States is:

1. A marking device for attachment to a user's wrist or other appendage, comprising:

(a) a cartridge receiver having a receptacle and a lower outer part;

(b) a marker cartridge having a container for holding a marker means, the marker cartridge and the cartridge receiver having twist-lock means for securely engaging the marker cartridge in the receptacle of the cartridge receiver; and (c) at least one strap attachment means connected to the lower outer part.

2. A marking device according to claim 1 wherein the receptacle is cylindrical and the receptacle has at least a partial base at a lower inner part.

3. A marking device according to claim 2 wherein the partial base has a central orifice to permit access to the marker cartridge when in place in the cartridge receiver.

4. A marking device according to claim 1 wherein the container has securing means for securing the marking means.

5. A marking device according to claim 4 wherein the container is cylindrical and the container has a base plate comprising a base, side walls and a hollow centre.

6. A marking device according to claim 5 wherein the base plate is removable, and when inserted into the container it forms a friction fit and is capable of being forced up or down the container by the application of pressure to the base plate, movement of the base plate adjusting the level of any contents of the container.

7. A marking device according to claim 4 wherein the marker cartridge further includes a base having a side wall, the side wall having a recess, and wherein the marking means has a ridge of a form complementing the recess, wherein the securing means includes the cooperating relationship between the recess and the ridge.

8. A marking device according to claim 1 wherein the marking means is a wax marker.

9. A marking device according to claim 1 wherein the marker cartridge has an upper part, and wherein a removable seal covers the upper part.

10. A marking device according to claim 1 further comprising at least one strap attached to the marker cartridge receiver, adapted to hold the marking device to a wrist of a user.

11. A marking device according to claim 1 wherein the marker cartridge further includes at least one flange and the cartridge receiver further includes at least one element constructed and arranged to cooperate with the at least one flange, said twist-lock means being formed by twisting the marker cartridge with respect to the cartridge receiver and engaging the at least one element with the at least one flange.

12. A method of marking stock comprising:

selecting a marker cartridge containing a marking means of a selected type, colour or design;

securely engaging the marker cartridge into a cartridge receiver;

attaching the cartridge receiver to a user's wrist or other appendage with a strap; and marking stock or any item with the selected marking means in the marker cartridge.

13. A marking device, comprising:

(a) a cartridge receiver having a receptacle and a lower outer part;

(b) a marker cartridge comprising a container and a removable base plate, the marker cartridge and the cartridge receiver having interlocking means for securely engaging the marker cartridge in the receptacle of the cartridge receiver, a marking means within the container being secured to the base plate, the base plate forming a friction fit within the container and moving upon the application of pressure to the base plate; and (c) at least one strap attachment means connected to the lower outer part.

14. A marking device for attachment to a user's wrist or other appendage, comprising:

(a) a cartridge receiver having a receptacle, a lower outer part, and a base, the base having an orifice;

(b) a marker cartridge comprising a container for holding a marker means, the marker cartridge being engaged in the receptacle of the cartridge receiver; and (c) at least one strap attachment means connected to the lower outer part, wherein the orifice within the base permits access to the marker cartridge when the marker cartridge is engaged in the receptacle.

* * * * *